US008909105B2

(12) United States Patent
Koakutsu

(10) Patent No.: US 8,909,105 B2
(45) Date of Patent: Dec. 9, 2014

(54) POWDER TRANSPORT DEVICE, AND IMAGE FORMING APPARATUS

(71) Applicant: Fuji Xerox Co., Ltd., Tokyo (JP)

(72) Inventor: Masafumi Koakutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/968,713

(22) Filed: Aug. 16, 2013

(65) Prior Publication Data

US 2014/0212177 A1 Jul. 31, 2014

(30) Foreign Application Priority Data

Jan. 25, 2013 (JP) ................................ 2013-011862

(51) Int. Cl.
*G03B 15/08* (2006.01)
*G03G 15/08* (2006.01)

(52) U.S. Cl.
CPC ........ *G03G 15/0879* (2013.01); *G03G 15/0839* (2013.01)
USPC .......................................... 399/255; 399/261

(58) Field of Classification Search
CPC ....................... G03G 15/0839; G03G 15/0822
USPC ................................. 399/254–256, 258, 261
See application file for complete search history.

(56) References Cited

U.S. PATENT DOCUMENTS

| | | | | |
|---|---|---|---|---|
| 6,266,511 | B1 * | 7/2001 | Murakami et al. | 399/358 |
| 8,103,197 | B2 * | 1/2012 | Matsumoto et al. | 399/260 |
| 2008/0260432 | A1 | 10/2008 | Ohyama et al. | |
| 2009/0317140 | A1 * | 12/2009 | Yoshida et al. | 399/254 |
| 2010/0290815 | A1 * | 11/2010 | Ichikawa et al. | 399/254 |
| 2010/0329699 | A1 | 12/2010 | Ohyama et al. | |
| 2011/0311281 | A1 | 12/2011 | Ohyama et al. | |
| 2012/0237268 | A1 * | 9/2012 | Sakashita et al. | 399/258 |

FOREIGN PATENT DOCUMENTS

| | | |
|---|---|---|
| JP | A-2008-83287 | 4/2008 |
| JP | A-2008-287214 | 11/2008 |

* cited by examiner

*Primary Examiner* — Walter L Lindsay, Jr.
*Assistant Examiner* — Rodney Bonnette
(74) *Attorney, Agent, or Firm* — Oliff PLC

(57) ABSTRACT

Provided is a powder transport device including a guide tube that guides a falling powder, a guide member that guides transport of the fallen powder, a transport member that is disposed in the guide member, has a helical member extending in a transport direction of the powder, and transports the fallen powder through rotation, and a swing member that is disposed at a lower end portion of the guide tube, and has a portion which is folded or bent in a direction of enclosing inner wall surfaces of the guide tube and a convex portion which intermittently contacts with the helical member so as to swing the portion.

11 Claims, 5 Drawing Sheets

POWDER TRANSPORT DEVICE, AND IMAGE FORMING APPARATUS

CROSS-REFERENCE TO RELATED APPLICATIONS

This application is based on and claims priority under 35 USC 119 from Japanese Patent Application Mo. 2013-011862 filed Jan. 25, 2013.

BACKGROUND

Technical Field

The present invention relates to a powder transport device, and an image forming apparatus,

SUMMARY

According to an aspect of the present invention, there is provided a powder transport device including: a guide tube that guides a falling powder; a guide member that guides transport of the fallen powder; a transport member that is disposed in the guide member, has a helical member extending in a transport direction of the powder, and transports the fallen powder through rotation; and a swing member that is disposed at a lower end portion of the guide tube, and has a portion which is folded or bent in a direction of enclosing inner wall surfaces of the guide tube and a convex portion which intermittently contacts with the helical member so as to swing the portion.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described.

Figure 1:
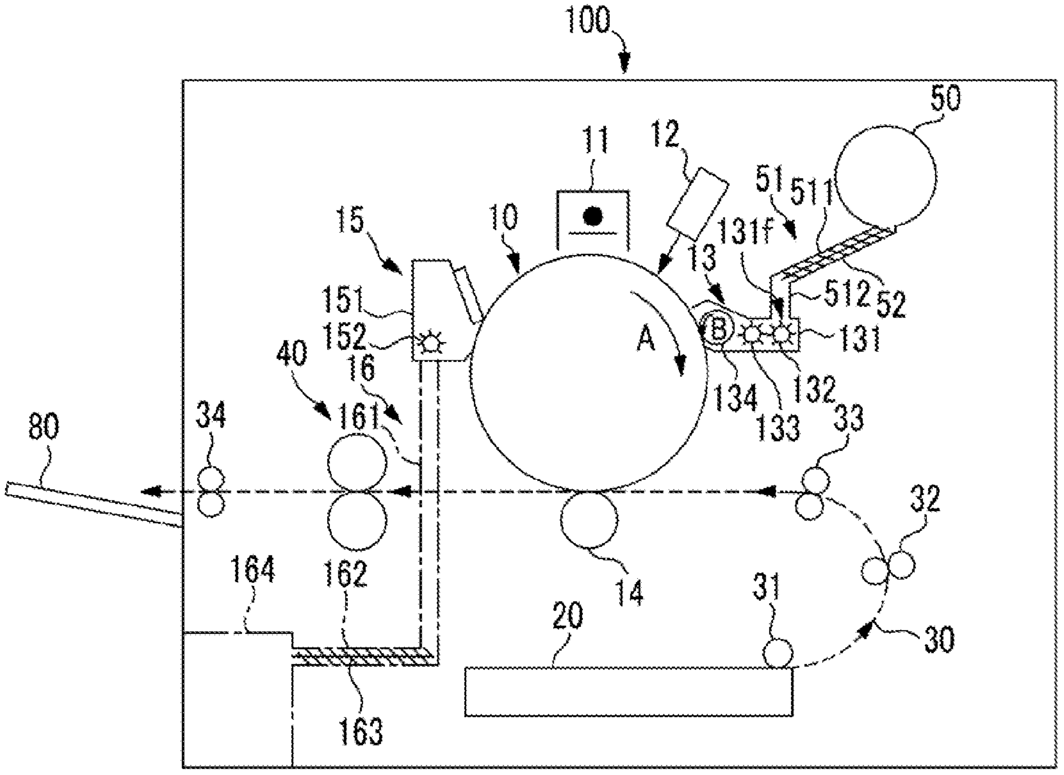
FIG. 1 is a schematic diagram illustrating an outline of an image forming apparatus according to an exemplary embodiment of the invention.

FIG. 1 is a schematic diagram illustrating an outline of an image forming apparatus according to an exemplary embodiment of the invention.

The image forming apparatus 100' is provided with a cylindrical photoconductor 10 which rotates in the arrow A direction, and includes a charging unit 11, an exposing unit 12, a developing unit 13, a transfer unit 14, and a cleaning unit 15 around the photoconductor 10.

The charging unit 11 charges the surface of the photoconductor 10 to a predetermined potential.

The exposing unit 12 irradiates the surface of the photoconductor 10 with exposure light which is modulated based on an image signal, so as to form an electrostatic latent image which is formed from the charged potential distribution, on the surface of the photoconductor 10.

A developer including toner and carrier is stored in the developing unit 13, and the developing unit 13 develops the electrostatic latent image on the photoconductor 10 with the toner of the developer so as to form a toner image on the surface of the photoconductor.

The transfer unit 14 transfers the toner image on the photoconductor 10 onto a sheet which is transported as described in the following.

The image forming apparatus 100 includes a sheet tray 20 in which sheets are stacked and are accommodated, and a sheet which is staked at the uppermost part of the sheets of the sheet tray 20 is extracted by a pickup roller 31. The extracted sheet is fed by a feed roller 32, the sheet transport temporarily stops at the moment when the front end of the sheet arrives at a registration roller 33, and the sheet waits in this state. In addition, timing is adjusted such that the waiting sheet proceeds to the position of the transfer unit 14 at the moment when the toner image on the photoconductor 10 arrives at the transfer unit 14, then the sheet is sent from the registration roller, and thereby the toner image on the photoconductor 10 is transferred onto the sheet through an operation of the transfer unit 14. A fixing unit 40 is provided on the further downstream side of the sheet transport path. The fixing unit 40 is a device which heats and presses the toner image on the transported sheet so as to fix the toner image onto the sheet. The sheet on which an image formed from the fixed toner image is formed by passing through the fixing unit 40 is sent to a sheet discharge tray 80 by a sheet discharge roller 34.

In addition, remaining toner particles on the photoconductor 10, which remain after the toner image is transferred, are removed from the photoconductor 10 by the cleaning unit 15. Here, the developing unit 13 includes two auger members 132 and 133 which extend in parallel to each other in the depth direction of FIG. 1, and a developing roller 134, in a case 131. These two auger members 132 and 133 are members which agitate the developer in the case 131 while circulating and moving the developer through rotation.

In addition, the developing roller 134 rotates in the arrow B direction, and has a role of carrying the developer in the case 131 to a region facing the photoconductor 10. The electrostatic latent image on the photoconductor 10 is developed by the toner of the developer transported by the developing roller 134. Therefore, when this developing is repeatedly performed, the toner of the developer in the case 131 runs low. For this reason, the image forming apparatus 100 has a toner cartridge 50 which stores toner particles and is attachable and detachable. When an amount of toner particles in the developing unit 13 decreases, the toner particles stored in the toner cartridge 50 are supplied to the developing unit 13 via a toner supply path 51 by the decrease amount thereof. Here, the toner supply path 51 includes a first supply path 511 for transporting toner supplied from the toner cartridge 50, and a second supply path 512 for allowing the toner transported via the first supply path 511 to fall into the case 131 of the developing unit 13. A transport member 52 which extends in a direction in which the first supply path extends and transports toner particles through rotation is provided in the first supply path 511, The transport member 52 rotates by the number of rotations corresponding to a decrease amount of the toner particles in the developing unit 13, and thereby toner particles are supplied to the developing unit 13 by the decrease amount of the toner in the developing unit 13. The second supply path 512 does not have a transport member, and has a structure in which toner particles are supplied from a toner inlet port 131*f* formed on the upper surface of the case 131 to the developing unit 13 by free fall thereof.

In addition, toner particles remaining on the photoconductor 10 are stored in a case 151 of the cleaning unit 15. The toner particles in the case 151 are transported to a corner in the depth direction by a transport member 152 which is provided in the case 151 and extends in the depth direction of FIG. 1, and is stored in a waste toner tank 164 via a toner discharge path 16. The toner discharge path 16 has a first discharge path 161 which vertically extends and allows free fall of the toner particles, and a second discharge path 162 which sends the fallen toner particles to the waste toner tank 164. A transport member 163 which extends in the toner discharge direction of the second discharge path 162 is provided in the second discharge path 162, and the toner particles which have fallen through the first discharge path 161 is transported to the waste toner tank 164 through the second discharge path 162 by the transport member 163.

Figure 2:
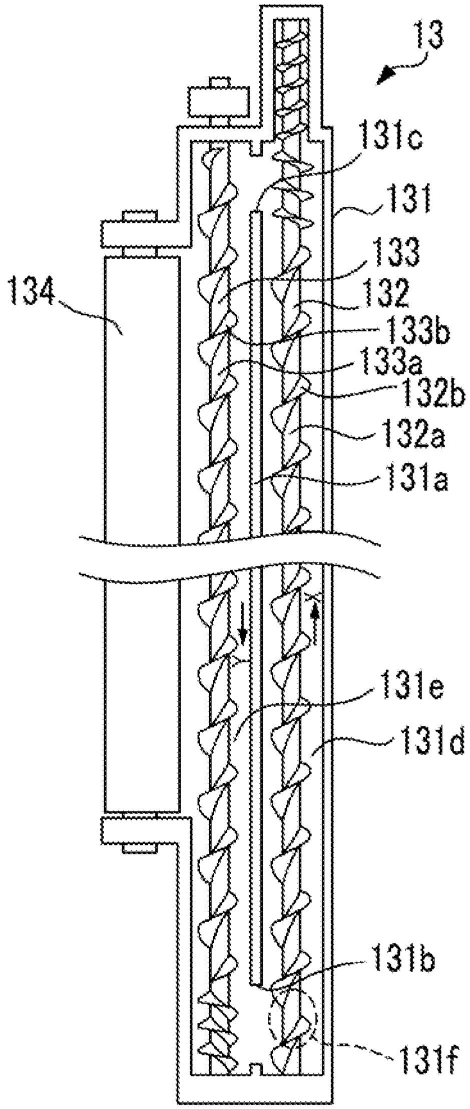
FIG. 2 is a transparent view illustrating inside of the developing unit of which an outline is shown in FIG. 1 when viewed from above.

FIG. 2 is a transparent view illustrating inside of the developing unit of which an outline is shown in FIG. 1 when viewed from above.

The developing unit 13 includes, as described with reference to FIG. 1, the two auger members 132 and 133 which extend in parallel to each other and the developing roller 134 which rotates in the arrow B direction shown in FIG. 1.

A partition wall 131*a*. is provided between the two auger members 132 and 133, and the case 131 is divided into two chambers 131*d* and 131*e*. Here, openings 131*b* and 131*c* are respectively formed at both end portions of the partition wall 131*a* in the longitudinal direction.

The two auger members 132 and 133 respectively have round bar-shaped rotating shafts 132*a* and 133*a* and helical blades 132*b* and 133*b* which are provided around the rotating shafts and are helically formed in the extending direction of the rotating shafts 132*a* and 133*a*. The two auger members 132 and 133 transport toner particles through rotation, one auger member 132 transports the toner particles in the case 131 in the arrow X direction, and the other auger member 133 transports the toner particles in the arrow Y direction. The toner inlet port 131*f* which receives toner particles supplied from the toner cartridge 50 via the toner supply path 51 is provided on the upper surface part of the case 131 corresponding to the end portion of one auger member 132 (refer to FIG. 1).

The new toner particles supplied from the toner inlet port 131*f* are transported in the arrow X direction in the chamber 131*d* in which one auger member 132 is disposed, and is agitated and mixed with a developer in the chamber 131*d* in the middle of the transport. The developer in which the new toner particles are agitated and mixed with the developer moves to the chamber 131*e* in which the other anger member 133 is disposed via the opening 131*c*, and, this time, the developer is transported in the arrow Y direction in the chamber 131*e* by the auger member 133 and moves to the chamber 131*d* via the other opening 131*b*.

The developer in the developing unit 13 circularly moves as described above, and new toner particles are also agitated and mixed.

The developing roller 134 receives the developer from the chamber 131*e* in which the auger member 133 is disposed and moves the developer to the region facing the photoconductor 10 shown in FIG. 1, and the developer in which an amount of the toner decreases due to the development and a ratio of the carrier increases is returned to the case 131 again. The developer in which a ratio of the carrier increases is transported, agitated, and mixed with new toner particles as described above, and is thus reproduced as a developer with an original ratio of the toner and the carrier.

Figure 3:
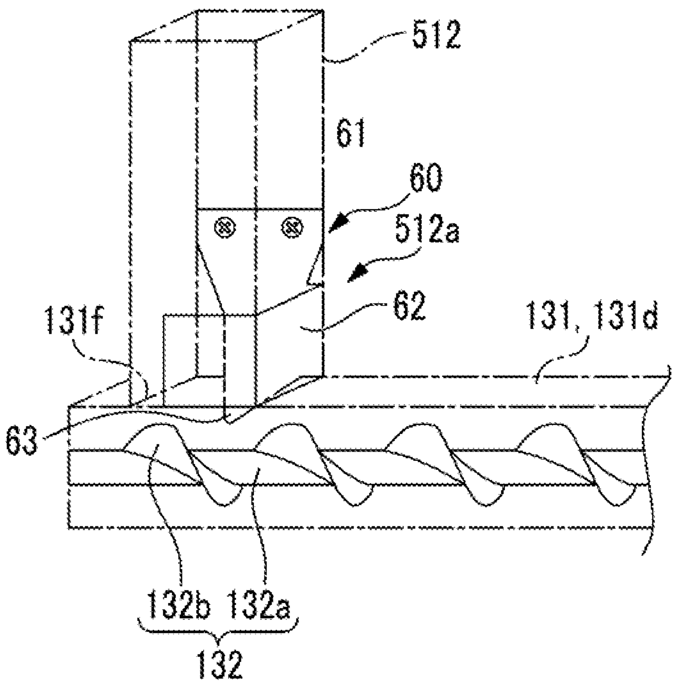
FIG. 3 is a schematic diagram illustrating the vicinity part of a toner inlet port of a toner supply path and the developing unit.

FIG. 3 is a schematic diagram of the vicinity part of the toner inlet port of the toner supply path and the developing unit.

Toner particles supplied from the toner cartridge 50 (refer to FIG. 1) fall through the second supply path 512 around the developing unit 13 as described, above, and are supplied, to the chamber 131*d* in which the auger member 132 is disposed, of the case 131 of the developing unit 13 from the toner inlet port 131*f*.

Here, a swing member 60 is disposed at a lower end portion 512*a* of the second supply path 512 along the inner wall surface thereof.

In the present exemplary embodiment, the second supply path 512 corresponds to an example of the guide tube recited in the claims, and the case 131 of the developing unit 13, particularly, the chamber 131*d* provided in the case 131 corresponds to an example of the guide member recited in the claims. In addition, the auger member 132 which is disposed in the chamber 131*d* and forms the developing unit 13 corresponds to an example of the transport member recited in the claims, and the helical blade 132*b* of the auger member 132 corresponds to an example of the helical member recited in the claims.

Figure 4:
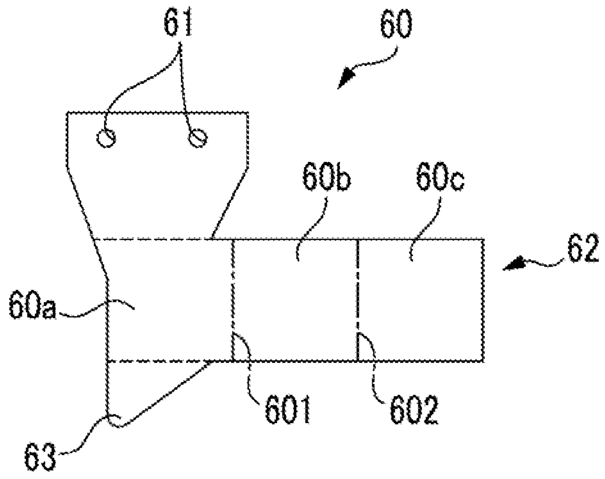
FIG. 4 is a development view of a swing member.

FIG. 4 is a development diagram of the swing member. The swing member will be described with reference to FIG. 4 along with FIG. 3.

The swing member 60 is formed of a PET film. The PET film is cut in a shape shown in FIG. 4 and has holes, is folded by 90° at two folding lines 601 and 602, is disposed, inside the lower end portion 512*a* of the second supply path 512, and is installed on the inner wall surface of the second supply path 512 by using the two holes 61.

Here, in the present exemplary embodiment, the second supply path 512 is a rectangular tube with a size of about a 10 mm (inner diameter) square, the left region 60*a* of the folding line 601 shown in FIG. 4 expands so as to be joined to the rear inner wall surface of the second supply path 512 shown in FIG. 3, the region 60*b* interposed between the two folding lines 601 and 602 expands so as to be joined to the right inner wall surface of the second supply path 512, and the right region 60*c* of the folding line 603 expands so as to be joined to the front inner wall surface of the second supply path 512. In other words, the part interposed between the upper and lower broken lines of the region 60*a*, the region 60*b*, and the region 60*c* of the swing member 60 are disposed at the lower end portion 512*a* of the second supply path 512, and are folded in a direction of enclosing the inner wall surfaces of the second supply path 512. Further, in this exemplary embodiment, the part is folded along the inner wall surfaces while coming into contact with the inner wall surfaces of the second supply path 512. Here, the part is referred to as a portion 62, In addition, a convex portion 63, which enters the case 131 of the developing unit and intermittently interferes with the helical blade 132*b* depending on rotation of the auger member

132 in the developing unit, is formed at the lower end portion of the region 60*a* of the swing member 60, When the convex portion 63 intermittently interferes with the helical blade 132*b* depending on the rotation of the auger member 132, the portion 62 of the swing member 60 is swung.

Here, unless the swing member 60 is disposed, particularly, in a case of small diameter toner of which the volume average particle diameter is 3.8 μm or less, it is observed that the lower end portion 512*a* of the second supply path 512 is clogged with toner. Even if a plate-shaped PET film corresponding to only the region 60*a* of the swing member 60 of FIG. 4 is disposed on the inner wail of the lower end portion 512*a* of the second supply path 512, and the lower end portion corresponding to the convex portion 63 is made to intermittently interfere with the helical blade 132*b* of the auger member 132, it is confirmed that an extent of improvement in toner clogging is low in the above-described small diameter toner. In contrast, since the swing member 60 according to the present exemplary embodiment has a simple and inexpensive configuration by providing the portion 62 through folding only, it is confirmed that toner clogging is prevented very effectively even in the small diameter toner by swinging the portion 62.

In addition, the swing member 60 according to the present exemplary embodiment has a shape in which each of the regions 60*a*, 60*b* and 60*c* is joined to the inner wall surface of the second supply path 512 and expands, but a shape thereof is not necessarily required to be the shape of being joined and. expanding. However, if a gap is formed between the inner wall surface of the second supply path 512 and the swing member 60, there is a concern that toner may enter the gap and partially clog the gap, and thus the portion 62 preferably has a shape of expanding so as to be joined, as in this exemplary embodiment.

In addition, although, in the present exemplary embodiment, the portion 62 is formed by folding the PET film, a material of the swing member is not necessarily required to be a PET film or a film, and may be hard and have a curved shape. However, the film is preferably used since it is difficult for vibration caused by swing to be transmitted to other members, for example, the second supply path 512 and the like.

Further, although, in the present exemplary embodiment, the description has been made that the second supply path 512 is a rectangular tube, a guide tube corresponding to the second supply path 512 may be a cylinder. In this case, a swing member may have a portion not through folding but through bending unlike the swing member 60 shown in FIG. 4.

In addition, although a description has been made here of an example of applying the present exemplary embodiment of the invention to the path for supplying toner to the developing unit 13 from the toner cartridge 50 in the image forming apparatus 100 shown in FIG. 1, for example, a swing member may be disposed at a connection part between the first discharge path 161 and the second discharge path 162 in the toner discharge path 16 shown in FIG. 1, and the toner transport device of the present exemplary embodiment of the invention has no limitation on applied parts.

Next, a relationship between a particle diameter of a toner and an angle of repose will be described. A volume average particle diameter of a toner particle is measured in an aperture diameter of 50 μm by using Coulter Multisizer II type (manufactured by Beckman Coulter, Inc.). In this case, the measurement is performed by dispersing toner particles in an electrolyte aqueous solution (isoton aqueous solution) and dispersing the toner particles with ultrasonic waves for thirty seconds or more.

As a measurement method, a measurement sample of 0.5 mg to 50 mg is added to a surfactant which is a dispersant, preferably, 5% sodium alkylhenzene sulfonate aqueous solution 2 ml, and the resultant is added to the electrolyte 100 ml to 150 ml. The electrolyte in which the measurement sample is suspended is dispersed for one minute by an ultrasonic dispersion device so as to measure a particle size distribution. The number of particles to be measured is 50,000.

By the use of the measured particle size distribution, a cumulative distribution is drawn from a small diameter side with reference to the volume in a. divided particle size range (channel), and a particle diameter in which a cumulative amount is 50% is defined as a volume average particle diameter.

Figure 5:
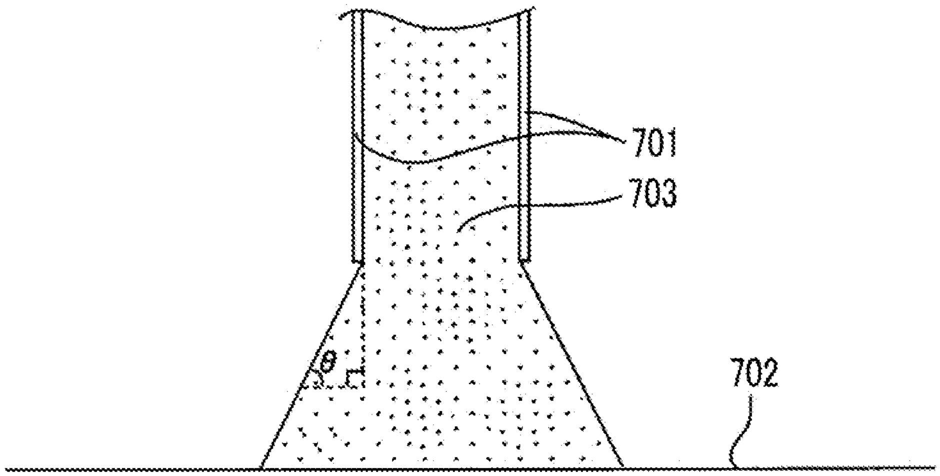
FIG. 5 is a diagram illustrating a method of measuring an angle of repose.

FIG. 5 is a diagram illustrating a method of measuring an angle of repose.

Toner 703 is made to fall onto a plate 702 from a tube 701. At this time, a mountain of the toner is formed on the plate 702, and a slope θ [degree] of the mountain is an angle of repose. If fluidity of the toner is high, the angle of repose θ decreases, and if fluidity of the toner is low, the angle of repose θ increases.

Figure 6:
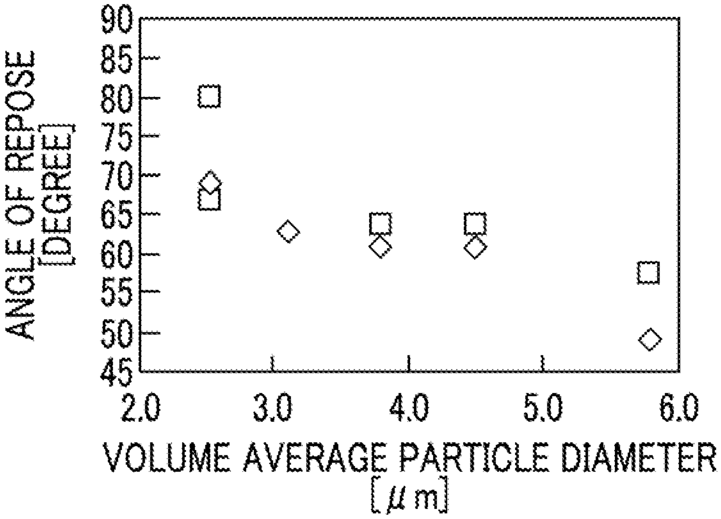
FIG. 6 is a diagram illustrating a measurement result of an angle of repose [degree] relative to a volume average particle diameter (μm) of toner particles.

FIG. 6 is a diagram illustrating a measurement result of an angle of repose [degree] relative to a volume average particle diameter [μm] of toner. The different symbols in the same volume average particle diameter indicate the different kinds of toner with the same volume average particle diameter.

As is clear from FIG. 6, it may be seen that the smaller the volume average particle diameter of toner, the greater the angle of repose. As described above, the greater the angle of repose, the lower the fluidity, and thus clogging easily occurs. Whether or not clogging occurs due to various toner was examined separately from the measurement result of an angle of repose, and toner clogging did not occur even if the swing member 60 was not disposed at the structure part shown in FIG. 3 in relation to toner of which the volume average particle diameter exceeds 5.0 μm. On the other hand, in relation to toner with the volume average particle diameter of 4.5 μm shown in FIG. 6, if was confirmed that clogging occurred unless the swing member 60 was disposed, and clogging did not occur if the swing member 60 was disposed. In addition, in relation to the respective toner with the volume average particle diameters of 3.8 μm, 3.1 μm, and 2.5 μm, occurrence of clogging was prevented if the swing member 60 was disposed.

In other words, it may be seen from FIG. 6 that the swing member 60 shown in FIGS. 3 and 4 effectively acts on preventing toner clogging in relation to toner with the volume average particle diameter of 4.5 μm or less or toner with the angle of repose of 60 degrees or more.

Next, a description will be made of another test method in which a relationship between a particle diameter and fluidity of toner was examined.

Figure 7:
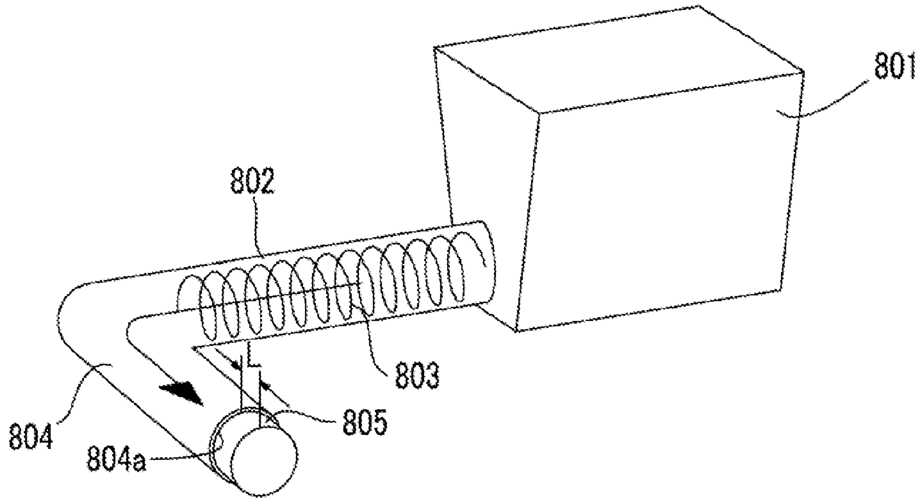
FIG. 7 is a schematic diagram illustrating a measurement test of a protruding amount of toner particles.

FIG. 7 is a schematic diagram illustrating a measurement test of a protruding amount of toner.

Toner in a container 801 is sent by a transport member 803 disposed inside a pipe 802, and are sent to a pipe 804 which is connected to the pipe 802 and is bent in an L shape. A transport member is not provided in the pipe 804. In addition, these pipes 802 and 804 are located at positions raised from the floor. The toner sent to inside of the pipe 804 are protruded from an outlet 804*a* by toner pushed from the backside. If a protruding amount increases, the protrusion part collapses and then falls on the floor, but, here, a protruding amount L immediately before the collapse is measured.

Measurement conditions at this time are as follows.

Toner weight: 20 g

Measurement time: 1 min

Pipe inner diameter: 14 mm

Transport member: spring auger

Auger diameter: 13 mm

Auger pitch: 10 mm

Number of rotations: 50 rpm

Figure 8:
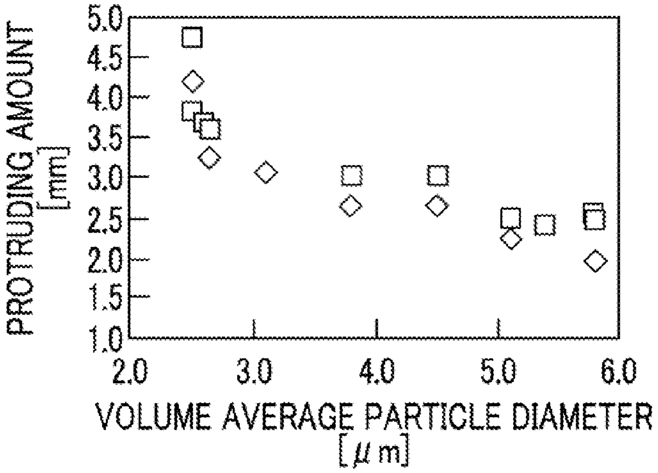
FIG. 8 is a diagram illustrating a measurement result of a protruding amount L [mm] relative to a volume average particle diameter [μm] of toner particles.

FIG. 8 is a diagram illustrating a measurement result of a protruding amount L [mm] relative to a volume average particle diameter [μm] of toner.

It is shown that the smaller the volume average particle diameter, the larger the protruding amount.

The fluidity of toner may be checked even by measuring the protruding amount instead of measurement of an angle of repose, and thus checking for toner clogging may be easy.

Alternatively, for example, it is possible to check the fluidity of toner and easily check toner clogging even by measuring an amount of toner sent per unit time in the configuration as shown in FIG. 7. It is known that an amount of toner sent per unit time decreases as the volume average particle diameter thereof is smaller even if a transport member corresponding to the transport member 803 of FIG. 7 is rotated at the same number of rotations. As a test result, an amount of sent toner was 0.23 g/sec in a case of toner with the volume average particle diameter of 5.8 μm, and 0.13 g/sec in a case of toner with the volume average particle diameter of 3.8 μm.

In the powder transport device and the image forming apparatus, it is preferable to prepare points as follows. The portion contacts with inner walls of the guide tube and is folded or bent along the inner walls. The swing member is a flexible sheet. The powder has a volume average particle diameter of 1.0 μm to 5.0 μm, preferably 2.0 μm to 4.5 μm and is an electrophotographic development toner. The toner has an angle of repose of 60 degrees or more. In the image forming apparatus, the toner transport unit includes the powder transport device as in the aspect that transports an electrophotographic development toner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder transport device comprising;

a guide tube that guides a falling powder;

a guide member that guides transport of the fallen powder;

a transport member that is disposed in the guide member, has a helical member extending in a transport direction of the powder, and transports the fallen powder through rotation; and a swing member that is disposed at a lower end portion of the guide tube, and has a portion which is folded or bent in a direction of enclosing inner wail surfaces of the guide tube and a convex portion which intermittently contacts with the helical member so as to swing the portion.

2. The powder transport device according to claim 1, wherein the portion contacts with inner wails of the guide tube and is folded or bent along the inner walls,

3. The powder transport device according to claim 1, wherein the swing member is a flexible sheet.

4. The powder transport device according to claim 1, wherein the powder has a volume average particle diameter of 1.0 μm to 5.0 μm.

5. The powder transport device according to claim 1, wherein the powder has a volume average particle diameter of 2.0 μm to 4.5 μm.

6. The powder transport device according to claim 1, wherein the powder is an electrophotographic: development toner.

7. The powder transport device according to claim 6, wherein the toner has an angle of repose of 60 degrees or more.

8. An image forming apparatus comprising:

an image forming unit that forms a toner image and fixes the toner image onto a recording medium; and a toner transport unit that is connected to the image forming unit and transports toner to the image forming unit, wherein the toner transport unit includes the powder transport device according to claim 6.

9. The image forming apparatus according to claim 8, wherein a volume average particle diameter of the toner is in a range from 1.0 μm to 5.0 μm.

10. The image forming apparatus according to claim 8, wherein the portion of the powder transport device contacts with inner wails of the guide tube and is folded or bent along the inner walls.

11. The image forming apparatus according to claim 8, wherein the swing member of the power transport device is a flexible sheet.

* * * * *